(12) United States Patent
Fukada et al.

(10) Patent No.: US 11,047,454 B2
(45) Date of Patent: Jun. 29, 2021

(54) INTERNAL COMBUSTION ENGINE

(71) Applicant: HONDA MOTOR CO., LTD., Tokyo (JP)

(72) Inventors: Yusuke Fukada, Wako (JP); Naoki Hotta, Wako (JP); Nobuharu Takahashi, Wako (JP); Hirokazu Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 296 days.

(21) Appl. No.: 16/277,487

(22) Filed: Feb. 15, 2019

(65) Prior Publication Data

US 2019/0293155 A1    Sep. 26, 2019

(30) Foreign Application Priority Data

Mar. 20, 2018    (JP) .............................. JP2018-052196

(51) Int. Cl.
  *F16H 7/08*    (2006.01)
  *F02B 67/06*    (2006.01)
  *F16H 7/02*    (2006.01)

(52) U.S. Cl.
  CPC ............... *F16H 7/08* (2013.01); *F02B 67/06* (2013.01); *F16H 7/02* (2013.01); *F16H 2007/081* (2013.01); *F16H 2007/0842* (2013.01); *F16H 2007/0865* (2013.01); *F16H 2007/0893* (2013.01); *F16H 2007/0897* (2013.01)

(58) Field of Classification Search
  CPC ........ F16H 7/08; F16H 7/02; F16H 2007/042; F16H 2007/0844; F16H 2007/0865; F16H 2007/0893; F16H 7/06; F16H 2007/0863; F16H 2007/0891; F16H 2007/0895; F16H 2007/0897; F16H 2007/081; F16H 2007/087; F16H 2007/0872; F16H 7/12; F16H 7/1281; F02B 67/00; F02B 67/04;
(Continued)

(56) References Cited

U.S. PATENT DOCUMENTS 4,299,584 A * 11/1981 Sproul .................... F02B 67/06
                                                                474/135
5,029,387 A *  7/1991 Mitchell ............... F16H 7/1281
                                                                29/888.01
(Continued)

FOREIGN PATENT DOCUMENTS

EP    1752645 A2 *  2/2007 ............ F02F 7/0073
JP    2011144813 A    7/2011

*Primary Examiner* — Michael R Mansen
*Assistant Examiner* — Raveen J Dias
(74) *Attorney, Agent, or Firm* — Armstrong Teasdale LLP

(57) ABSTRACT

An internal combustion engine, includes: a cylinder block; a crankshaft rotatably supported in the cylinder block; an oil pan fastened to a lower end portion of the cylinder block; a chain case fastened to one end wall of the cylinder block in an axial direction of the crankshaft; a belt wound around a crank pulley provided on an end portion of the crankshaft protruding from the chain case and an accessory pulley provided on an engine accessory; and a tensioner contacting a back surface of the belt and applying a tension to the belt, wherein the tensioner includes multiple fastening portions, such that one of the fastening portions is fastened to at least one of the cylinder block and the chain case, and another one of the fastening portions is fastened to the oil pan.

5 Claims, 6 Drawing Sheets

(58) Field of Classification Search
CPC . F02B 67/06; F02F 7/0073; F02F 2007/0075; F02F 2007/0078
USPC .................................................. 474/133, 136
See application file for complete search history.

(56) References Cited

U.S. PATENT DOCUMENTS

| | | | | |
|---|---|---|---|---|
| 5,040,494 A * | 8/1991 | Okita | .................. | F01P 5/10 123/41.46 |
| 5,058,558 A * | 10/1991 | Ueda | .................. | F02M 35/10354 123/559.1 |
| 5,129,375 A * | 7/1992 | Takane | .................. | F01L 1/02 123/195 C |
| 6,360,712 B1 * | 3/2002 | Banks | .................. | F02B 67/00 123/195 A |
| 6,619,253 B2 * | 9/2003 | Kobayashi | .................. | F01L 1/02 123/195 C |
| 7,717,080 B1 * | 5/2010 | Grozich | .................. | F16H 7/1281 123/195 A |
| 2001/0049978 A1 * | 12/2001 | Iwata | .................. | F16M 1/00 74/606 R |
| 2003/0004023 A1 * | 1/2003 | Hotta | .................. | F02B 67/06 474/101 |
| 2003/0084865 A1 * | 5/2003 | Yamagata | .................. | F02F 7/0012 123/195 A |
| 2008/0173275 A1 * | 7/2008 | Koyama | .................. | F16H 7/08 123/196 R |
| 2009/0301429 A1 * | 12/2009 | Takashina | .................. | F02B 67/06 123/197.5 |
| 2012/0052996 A1 * | 3/2012 | Koiwa | .................. | F16H 7/0848 474/110 |
| 2013/0125856 A1 * | 5/2013 | Itakura | .................. | F01P 5/10 123/198 R |
| 2013/0133611 A1 * | 5/2013 | Koiwa | .................. | F02F 7/0073 123/195 C |
| 2016/0273624 A1 * | 9/2016 | Suzuki | .................. | F16H 7/1281 |
| 2017/0335811 A1 * | 11/2017 | Turner | .................. | F02M 59/10 |
| 2018/0038457 A1 * | 2/2018 | Basile | .................. | F16H 7/1281 |
| 2018/0266312 A1 * | 9/2018 | Iwagami | .................. | F16H 7/08 |
| 2018/0334928 A1 * | 11/2018 | Yamauchi | .................. | F16H 7/08 |
| 2019/0001806 A1 * | 1/2019 | Takami | .................. | F02D 41/0007 |
| 2019/0072159 A1 * | 3/2019 | Kwon | .................. | F16H 55/36 |
| 2019/0085953 A1 * | 3/2019 | Kwon | .................. | F16H 55/36 |

\* cited by examiner

INTERNAL COMBUSTION ENGINE

TECHNICAL FIELD

The present invention relates to an internal combustion engine (may be simply referred to as an engine in the following description) provided with an accessory drive belt tensioner.

BACKGROUND ART

In the field of internal combustion engines, a tensioner for applying a tension to an accessory drive belt wound around a crank pulley and an accessory pulley is known. The tensioner may be disposed on a part of an end wall of the engine above the crank pulley (for example, see JP2011-144813A).

In recent years, it is demanded to reduce the size of the engine and the engine room. Therefore, it may be difficult or impossible to dispose the tensioner on a part of the end surface of the engine above the crank pulley because at such a position the tensioner may interfere with another device. Particularly, the freedom of layout of the tensioner on an upper part of the engine is likely to be quite limited because various components such as devices and pipes constituting an intake system, a battery, etc. are arranged on the upper part of the engine.

SUMMARY OF THE INVENTION

In view of the above background, a primary object of the present invention is to provide an internal combustion engine in that the degree of freedom of layout of an accessory drive belt tensioner is improved.

To achieve the above object, an embodiment of the present invention provides an internal combustion engine, comprising: a cylinder block (2); a crankshaft (10) rotatably supported in the cylinder block; an oil pan (5) fastened to a lower end portion of the cylinder block; a chain case (4) fastened to one end wall of the cylinder block in an axial direction of the crankshaft; a belt (31) wound around a crank pulley (23) provided on an end portion of the crankshaft protruding from the chain case and an accessory pulley (26A) provided on an engine accessory (26); and a tensioner (35) contacting a back surface of the belt and applying a tension to the belt, wherein the tensioner includes multiple fastening portions (36B, 36C), such that one (36B) of the fastening portions is fastened to at least one of the cylinder block and the chain case, and another one (36C) of the fastening portions is fastened to the oil pan.

According to this arrangement, it is possible to mount the tensioner on a lower part of the internal combustion engine. Since the devices and pipes of the intake system are typically not arranged around the lower part of the engine, the tensioner can avoid interfering with the components of the intake system. In addition, because the tensioner is fastened to the oil pan and to at least one of the cylinder block and the chain case, the position of the oil pan relative to the cylinder block and the chain case is constrained by the tensioner, whereby a gap is prevented from being formed between the cylinder block and the oil pan.

In the above arrangement, preferably, the oil pan protrudes more outward than the end wall of the cylinder block in the axial direction of the crankshaft, and the chain case has a lower end fastened to an upper end of an end portion of the oil pan in a vertical direction.

According to this arrangement, because the tensioner is fastened to the oil pan and to at least one of the cylinder block and the chain case, the position of the oil pan relative to the cylinder block and the chain case is constrained by the tensioner, whereby a gap is prevented from being formed between the chain case and the oil pan.

In the above arrangement, preferably, the tensioner includes a base member (36) provided with the multiple fastening portions, an arm member (37) having a base end rotatably supported by the base member and a tip end provided with a roller, and an urging member (38) urging the arm member relative to the base member in a direction in which the tip end of the arm member approaches the belt, and the arm member extends upward from the base end to the tip end in a state where the roller is in contact with the belt.

According to this arrangement, projection of the tensioner on a side of the engine can be suppressed, and therefore, it is possible to avoid interference of the tensioner with other devices. Further, the size of the engine can be reduced.

In the above arrangement, preferably, a lower end of the arm member is located lower than a rotation center of the crank pulley, and an upper end of the arm member is located higher than the rotation center of the crank pulley.

According to this arrangement, the arm member can be arranged by effectively using a space on a side of the crank pulley. This also contributes to the reduction in size of the engine.

In the above arrangement, preferably, the oil pan is fastened to the chain case by a bolt (19) extending vertically, and the fastening portions of the tensioner are fastened to the chain case and the oil pan by bolts (44, 45) extending in the axial direction of the crankshaft.

According to this arrangement, the direction of extension of each bolt fastening the tensioner to the chain case or fastening the tensioner to the oil pan is substantially perpendicular to the direction of extension of the bolt fastening the oil pan to the chain case. This achieves a firm connection between the chain case and the oil pan by the tensioner, thereby preventing a gap from being formed between the chain case and the oil pan more reliably.

In the above arrangement, preferably, the oil pan includes a flange (18) fastened to the lower end portion of the cylinder block, a ridge (17F) extending downward from the flange, and a fastening seat (42) provided on the ridge and fastened to the other one of the fastening portions of the tensioner.

According to this arrangement, the fastening seat is provided on a part of the oil pan having a high stiffness, and therefore, the tensioner can be supported stably.

According to the foregoing arrangement, it is possible to provide an internal combustion engine in that the freedom of layout of an accessory drive belt tensioner is improved.

DESCRIPTION OF THE PREFERRED EMBODIMENT(S)

Figure 1:
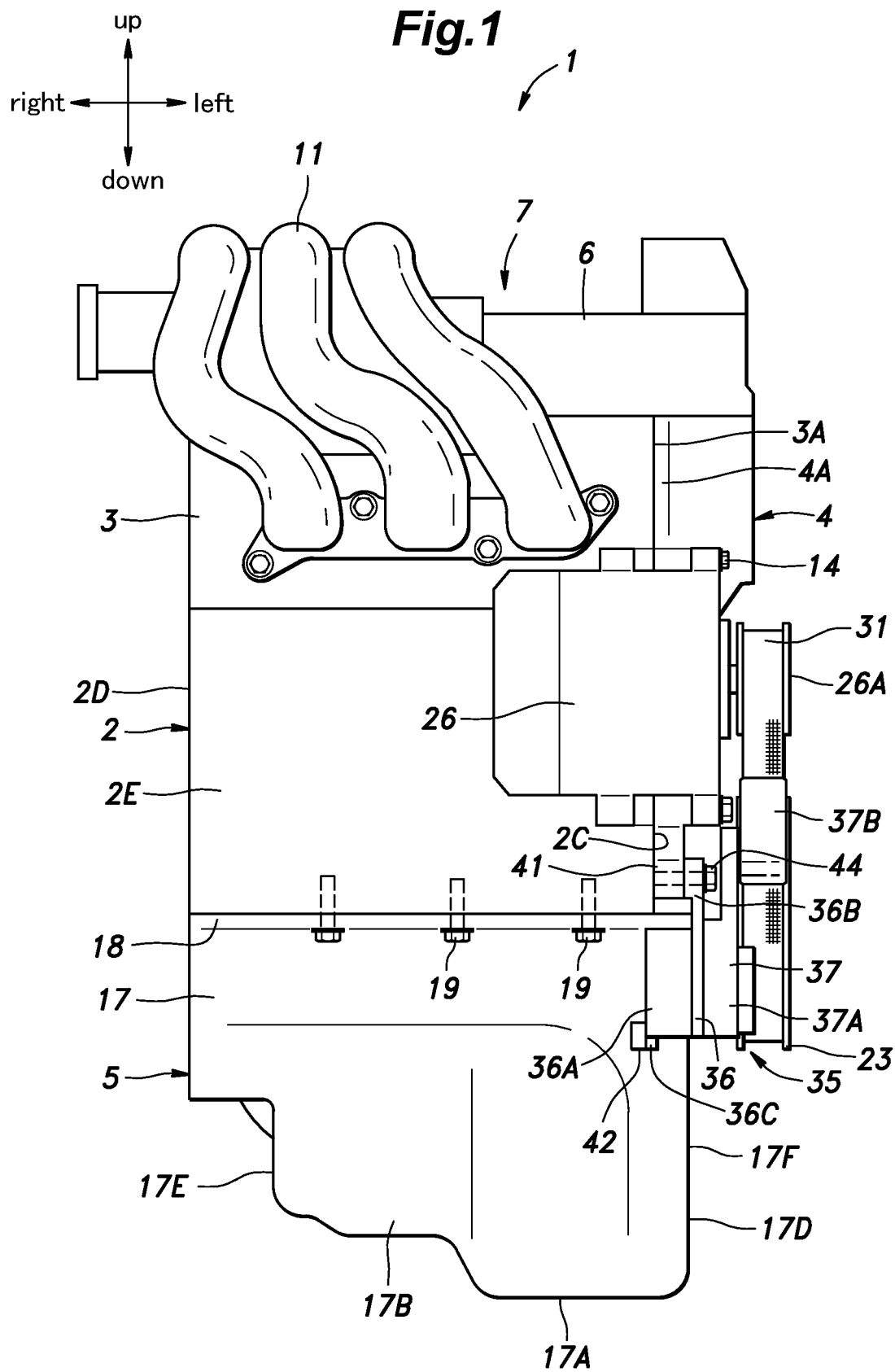
FIG. 1 is a front view of an internal combustion engine according to the first embodiment.

In the following, an embodiment of an internal combustion engine according to the present invention will be described with reference to the appended drawings. In the following description, directions are defined with reference to the vehicle body to which the engine is mounted. Thus, the directions indicated in the drawings change if the engine orientation relative to the vehicle body changes.

Figure 2:
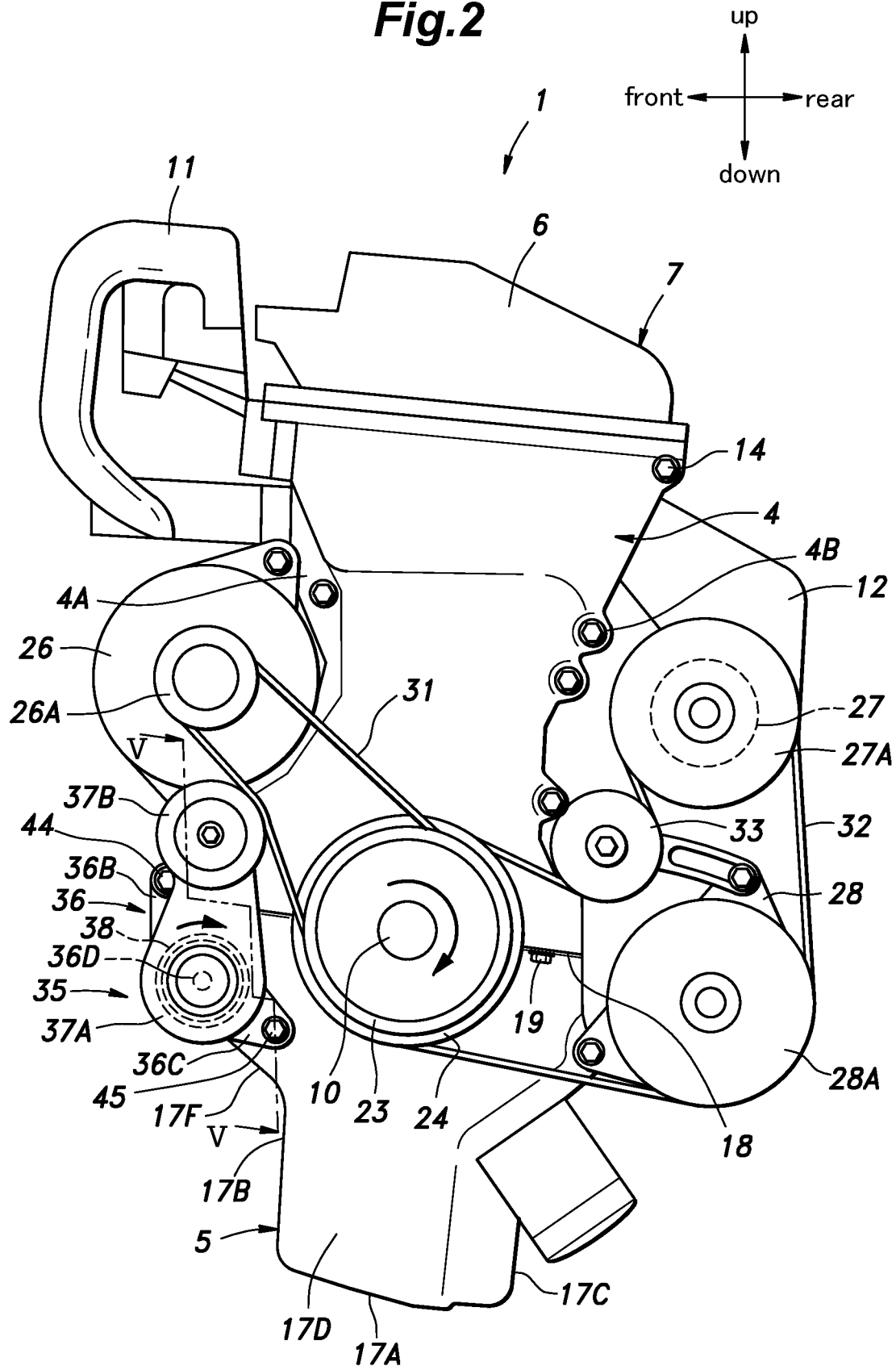
FIG. 2 is a left side view of the engine according to the first embodiment.

As shown in FIGS. 1 and 2, an internal combustion engine 1 has an engine body 7 which includes a cylinder block 2, a cylinder head 3, a chain case 4, an oil pan 5, and a head cover 6.

An upper part of the cylinder block 2 is formed as a cylinder part in which multiple cylinders are formed, and a lower part of the cylinder block 2 is formed as a crankcase part having a box-like shape that opens downward. Inside the crankcase part, a crankshaft 10 is rotatably supported. In the present embodiment, the cylinder block 2 is mounted in the engine room transversely such that an axial direction of the crankshaft 10 coincides with the lateral direction of the vehicle body. Thus, an intake-exhaust direction, which is perpendicular to the axial direction of the crankshaft 10 and the vertical direction coincides with the fore and aft direction of the vehicle body. The cylinder block 2 has a left end wall 2C and a right end wall 2D on respective ends thereof in the axial direction of the crankshaft 10, and a front wall 2E and a rear wall on respective ends thereof in the intake-exhaust direction. An intake manifold 11 is attached on a front wall of the cylinder head 3, and an exhaust pipe 12 is attached on a rear wall of the cylinder head 3.

The chain case 4 is mounted on the left end wall 2C of the cylinder block 2 and a left end wall 3A of the cylinder head 3. The chain case 4 extends vertically and has a front flange 4A and a rear flange 4B at front and rear edges thereof, respectively. The chain case 4 is fastened to the left end wall 2C of the cylinder block 2 and the left end wall 3A of the cylinder head 3 at the front flange 4A and the rear flange 4B. The chain case 4 is fastened to the cylinder block 2 and the cylinder head 3 by multiple bolts 14 each extending through the front flange 4A or the rear flange 4B and threadably engaged with the cylinder block 2 or the cylinder head 3. Each bolt 14 extends in the axial direction of the crankshaft 10. The chain case 4 defines a chain chamber in cooperation with left end surfaces of the cylinder block 2 and the cylinder head 3. An upper end of the chain chamber opens upward, and a lower end of the chain chamber opens downward.

The head cover 6 is fastened to upper end portions of the cylinder head 3 and the chain case 4. The head cover 6 defines a valve chamber in cooperation with an upper end surface of the cylinder head 3. A left end portion of the valve chamber is connected to an upper end opening of the chain chamber. In the chain chamber and a left end portion of the valve chamber is disposed a timing chain that connects the crankshaft 10 with a camshaft constituting a valve operating mechanism.

The oil pan 5 includes a main body 17 having a box-like shape that opens upward, and a flange 18 provided along an upper edge of the main body 17. The main body 17 includes a substantially rectangular bottom portion 17A that is elongated laterally, a front wall 17B and a rear wall 17C extending laterally along a front edge and a rear edge of the bottom portion 17A, respectively, and a left wall 17D and a right wall 17E extending in the fore and aft direction along a left edge and a right edge of the bottom portion 17A, respectively. At boundaries (corners) between adjoining ones of the front wall 17B, the left wall 17D, the rear wall 17C, and the right wall 17E are formed ridges 17F that extend vertically.

As shown in FIG. 1, the main body 17 of the oil pan 5 is formed to be longer than the cylinder block 2 in the axial direction of the crankshaft 10. The right wall 17E of the main body 17 is located at a position corresponding to the right end wall 2D of the cylinder block 2, while the left wall 17D of the main body 17 is located more leftward than the left end wall 2C of the cylinder block 2. Namely, the left end portion of the oil pan 5 protrudes more outward (leftward) than the left end wall 2C of the cylinder block 2. The oil pan 5 is fastened at the flange 18 thereof to a lower end portion of the cylinder block 2 and a lower end portion of the chain case 4. The oil pan 5 is fastened to the cylinder block 2 and the chain case 4 by multiple bolts 19 each extending through the flange 18 and threadably engaged with the cylinder block 2 or the chain case 4. Each bolt 19 extends vertically. An internal space of the oil pan 5 is connected to a lower end of the chain chamber at a left end portion thereof.

Figure 3:
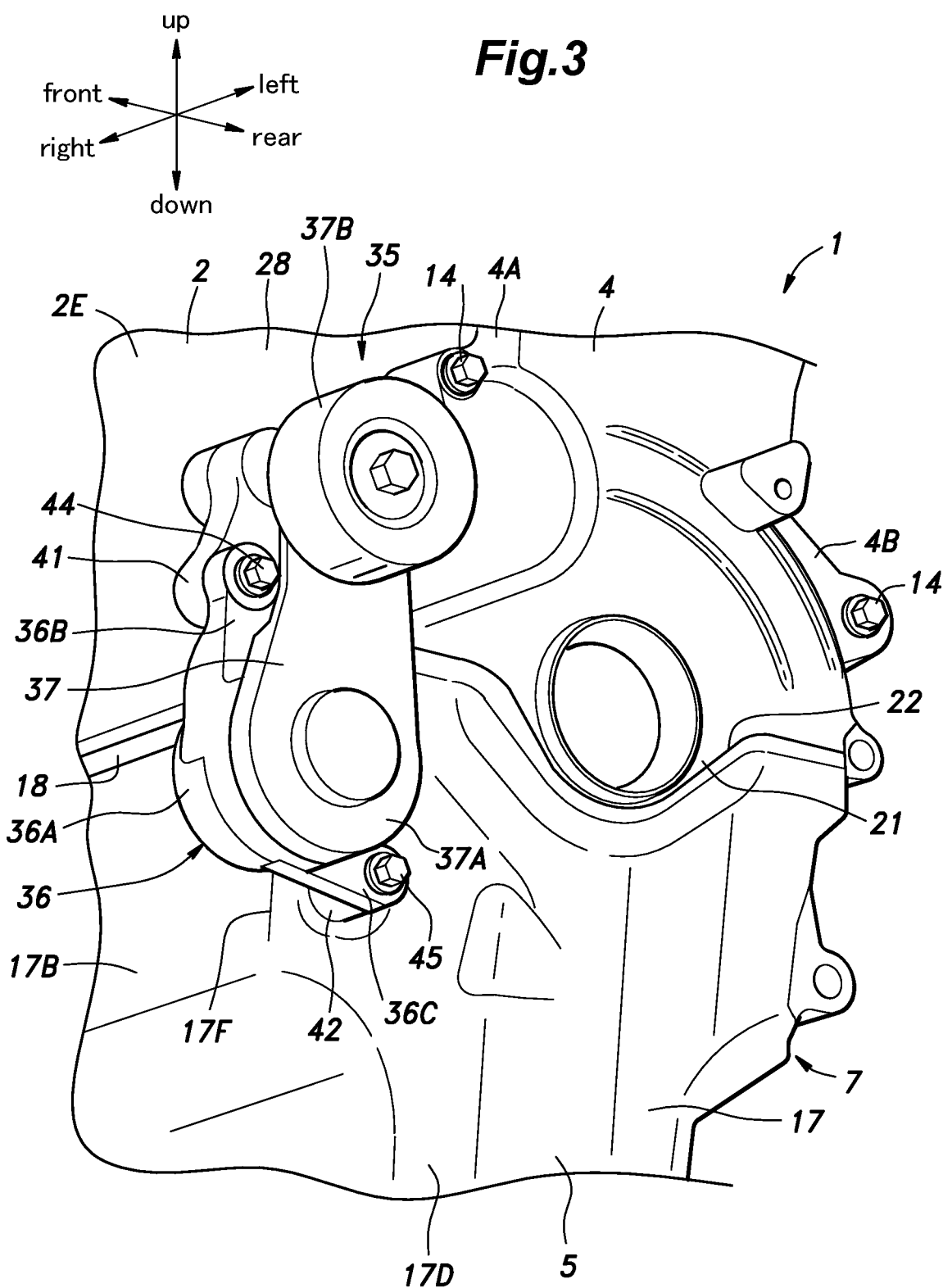
FIG. 3 is a perspective view showing a tensioner of the engine according to the first embodiment and a surrounding part thereof, in which a crankshaft and a power generator are omitted.

As shown in FIG. 3, the chain case 4 is provided with a convex portion 21 that protrudes downward at the center of a lower end thereof, and the left wall 17D of the oil pan 5 is provided with a recessed portion 22 at the center of an upper end thereof such that the convex portion 21 is fitted in the recessed portion 22. The convex portion 21 and the recessed portion 22 are each formed in a substantially semicircular shape as viewed in a direction along the axis of the crankshaft 10. Owing to the fastening by the bolts 19, relative movement between the chain case 4 and the left wall 17D of the oil pan 5 in the fore and aft direction is constrained. Further, the fitting of the convex portion 21 in the recessed portion 22 also contributes to constraining of the relative movement between the chain case 4 and the left wall 17D of the oil pan 5 in the fore and aft direction.

As shown in FIGS. 1 and 2, the left end of the crankshaft 10 extends through the left end wall 2C of the cylinder block 2 and the chain case 4 to protrude to the left of the chain case 4. On the left end of the crankshaft 10 protruding to the left of the chain case 4, a first crank pulley 23 and a second crank pulley 24 are provided in this order from the left end side. As shown in FIG. 2, the crankshaft 10 rotates clockwise as viewed from the left.

A power generator 26, a water pump 27, and an air compressor 28 are mounted on the engine body 7 as engine accessories. The power generator 26 is disposed in front of a left portion of the front wall 2E of the cylinder block 2. The power generator 26 may be a motor-generator that can operate in a motoring mode in addition to a regeneration mode. The power generator 26 is fastened to the front flange 4A of the chain case 4 and the cylinder block 2 preferably by use of the bolts 14 that fasten the chain case 4 to the cylinder block 2. The drive shaft of the power generator 26 is disposed in parallel with the axis of the crankshaft 10 and is provided with a generator pulley 26A.

The water pump 27 is disposed behind a left portion of the rear wall of the cylinder block 2. The water pump 27 is fastened to the rear wall of the cylinder block 2. The drive shaft of the water pump 27 is disposed in parallel with the axis of the crankshaft 10 and is provided with a water pump pulley 27A.

The air compressor 28 is disposed behind the left portion of the rear wall of the cylinder block 2 and below the water pump 27. The air compressor 28 is fastened to a bracket secured to the cylinder block 2. The air compressor 28 is also fastened to the oil pan. The drive shaft of the air compressor 28 is disposed in parallel with the axis of the crankshaft 10 and is provided with a compressor pulley 28A.

The first crank pulley 23 and the generator pulley 26A are arranged on a common imaginary plane perpendicular to the axis of the crankshaft 10. A first belt 31 is wound around the first crank pulley 23 and the generator pulley 26A. The second crank pulley 24, the water pump pulley 27A, and the compressor pulley 28A are arranged on a common imaginary plane perpendicular to the axis of the crankshaft 10. A second belt 32 is wound around the second crank pulley 24, the water pump pulley 27A, and the compressor pulley 28A. Between the second crank pulley 24 and the water pump pulley 27A is disposed an idle pulley 33, which is rotatably supported by the cylinder block 2 and contacts a back surface of the second belt 32.

The generator pulley 26A is disposed at a position higher than and forward of the first crank pulley 23, namely, at a position obliquely above the first crank pulley 23. As shown in FIGS. 1 and 2, a tensioner (tension applying device) 35 for applying a tension to the first belt 31 is provided in front of the first crank pulley 23. The tensioner 35 includes a base member 36, an arm member 37, and an urging member 38.

As shown in FIGS. 1 to 4, the base member 36 has a case portion 36A in a bottomed cylindrical shape and a first fastening portion 36B and a second fastening portion 36C that protrude from an outer circumference of the case portion 36A in different radial directions. The first fastening portion 36B and the second fastening portion 36C are each formed in a plate-like shape perpendicular to an axis of the case portion 36A. An angle defined between the first fastening portion 36B and the second fastening portion 36C about the axis of the case portion 36A is preferably in a range from 90 degrees to 180 degrees. The first fastening portion 36B is fastened to at least one of the cylinder block 2 and the chain case 4, and the second fastening portion 36C is fastened to the oil pan 5. In the illustrated embodiment, the first fastening portion 36B is fastened to a first fastening seat 41 provided on the chain case 4 by a bolt 44, and the second fastening portion 36C is fastened to a second fastening seat 42 provided on the left wall 17D of the oil pan 5 by a bolt 45. The bolt 44 and the bolt 45 extend in the axial direction of the crankshaft 10.

Figure 4:
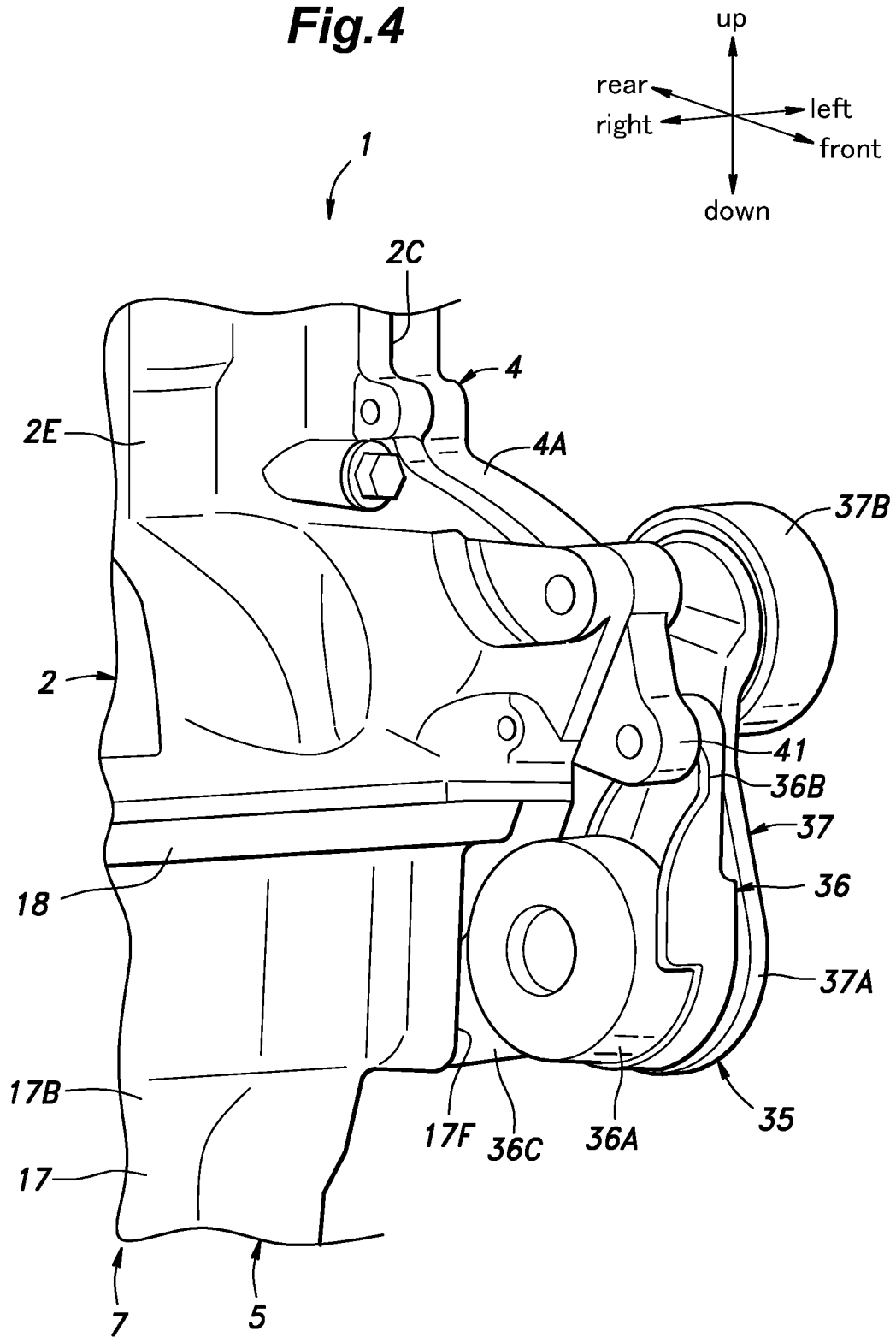
FIG. 4 is a perspective view showing the tensioner and the surrounding part thereof, in which the power generator is omitted.
Figure 5:
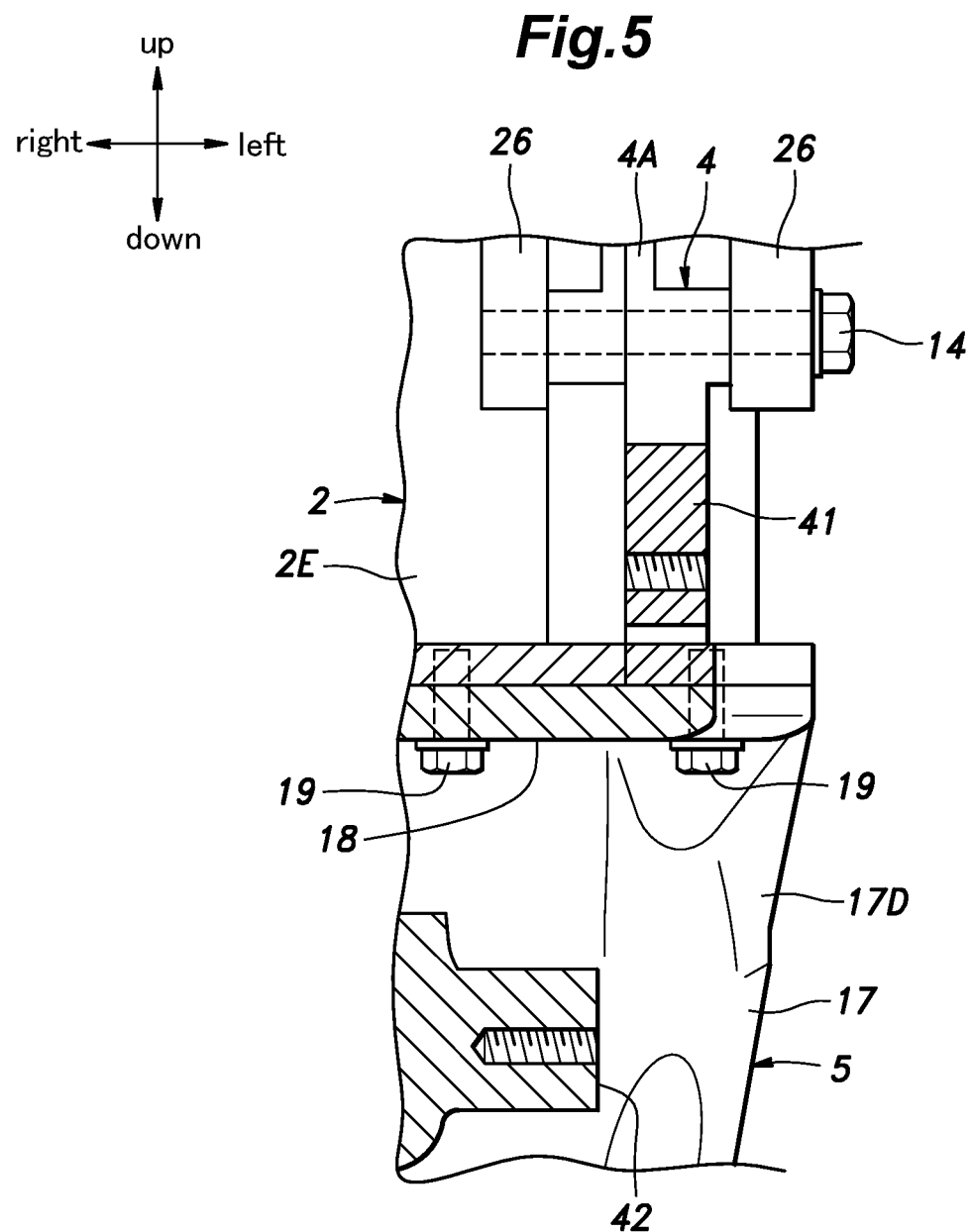
FIG. 5 is a sectional view taken along line V-V in FIG. 2, in which the tensioner is omitted.

As shown in FIGS. 3 to 5, the first fastening seat 41 is provided on the front flange 4A of the chain case 4, and protrudes forward relative to the front edge of the left end wall 2C of the cylinder block 2. As shown in FIGS. 3 and 5, the second fastening seat 42 is a boss formed to protrude on an outer surface of the left wall 17D of the oil pan 5, and is located behind the ridge 17F formed at the boundary between the left wall 17D and the front wall 17B. The second fastening seat 42 is preferably located close to the ridge 17F.

As shown in FIG. 2, a support shaft 36D is provided at the center of the case portion 36A, and the arm member 37 is rotatably supported by the support shaft 36D at a base end portion 37A thereof. The case portion 36A and the support shaft 36D are provided in parallel with the axis of the crankshaft 10. The arm member 37 extends from the base end portion 37A in a radial direction with the support shaft 36D being the center, and is provided with a roller 37B at a tip end (free end) thereof. The roller 37B is supported by the tip end of the arm member 37 to be rotatable about an axis parallel with the axis of the crankshaft 10. In the present embodiment, the urging member 38 consists of a torsion coil spring, and is disposed inside the case portion 36A. The urging member 38 has one end engaged with the case portion 36A and another end engaged with the arm member 37, and urges the arm member 37 relative to the base member 36 in a rotational direction in which the tip end of the arm member 37 approaches the back surface of the first belt 31. In the present embodiment, as shown in FIG. 2, the arm member 37 is urged clockwise as viewed from the left. Thus, the arm member 37 is urged by the urging member 38 toward the first belt 31, and contacts the back surface of the first belt 31 with the roller 37B. The tensioner 35 is arranged such that the roller 37B contacts the slack side of the first belt 31 during regeneration of the power generator 26 (or when the generator pulley 26A is driven by the crankshaft 10).

The first fastening seat 41 is disposed forward of the second fastening seat 42 and forward of the front wall 17B of the oil pan 5. The case portion 36A is located lower than the first fastening seat 41 and forward of the second fastening seat 42. The right end portion of the case portion 36A is located in front of the front wall 17B of the oil pan 5. Namely, as shown in FIG. 1, the case portion 36A has a part overlapping with the front wall 17B of the oil pan 5 as viewed from the front.

As shown in FIG. 2, in the state where the roller 37B is in contact with the first belt 31, the arm member 37 extends upward from the base end to the tip end thereof. The lower end of the arm member 37 is located lower than the rotation center of the first crank pulley 23, and the upper end of the arm member 37 is located higher than the rotation center of the first crank pulley 23. Namely, the arm member 37 is disposed in front of the first crank pulley 23. Further, the arm member 37 is located below the generator pulley 26A. As viewed in the direction along the axis of the crankshaft 10, the part of the tensioner 35 located foremost is located rearward of the front end of the power generator 26.

In the engine 1 configured as described above, the tensioner 35 can be mounted to a lower part of the engine 1. Since the devices and pipes of the intake system are typically not arranged around the lower part of the engine 1, the tensioner 35 can avoid interfering with the components of the intake system.

Because the base member 36 of the tensioner 35 is fastened to the oil pan 5 and the chain case 4, the position of the oil pan 5 relative to the chain case 4 is constrained by the base member 36, whereby a gap is prevented from being formed between the chain case 4 and the oil pan 5. In addition, because the cylinder block 2 and the oil pan 5 are joined to each other via the base member 36 and the chain case 4, the position of the oil pan 5 relative to the cylinder block 2 is constrained, whereby a gap is prevented from being formed between the cylinder block 2 and the oil pan 5.

In the above-described embodiment, the bolt 44 fastening the base member 36 of the tensioner 35 to the chain case 4 and the bolt 45 fastening the base member 36 to the oil pan 5 extend in a direction substantially perpendicular to the direction of extension of the bolts 19 fastening the oil pan 5 to the cylinder block 2 and the chain case 4. This achieves a firm connection between the chain case 4 and the oil pan 5 by the base member 36 of the tensioner 35, thereby preventing a gap from being formed between the chain case 4 and the oil pan 5 as well as between the cylinder block 2 and the oil pan 5.

In addition, because the arm member 37 extends vertically below the power generator 26 in the state where the roller 37B is in contact with the first belt 31, projection of the tensioner 35 on a front side of the engine 1 can be suppressed, and therefore, it is possible to avoid interference of the tensioner 35 with other devices. Further, the size of the engine 1 can be reduced.

In the above embodiment, the tensioner 35 is disposed in front of the first crank pulley 23, and therefore, the arm member 37 can be arranged by effectively using a space on a front side of the first crank pulley 23. This also contributes to the reduction in size of the engine 1.

Further, because the second fastening seat 42, to which the second fastening portion 36C of the base member 36 of the tensioner 35 is fastened, is provided on a part of the oil pan 5 having a relatively high stiffness, the tensioner 35 can be supported stably.

A concrete embodiment of the present invention has been described in the foregoing, but the present invention is not limited to the embodiment and may be modified or altered in various ways. For example, the first fastening portion 36B may be fastened to both of the chain case 4 and the cylinder block 2 by a common bolt. Also, the first fastening portion 36B may be fastened to only the cylinder block 2. The base member 36 of the tensioner 35 may include another fastening portion fastened to at least one of the cylinder block 2 and the chain case 4 or to the oil pan 5.

Figure 6:
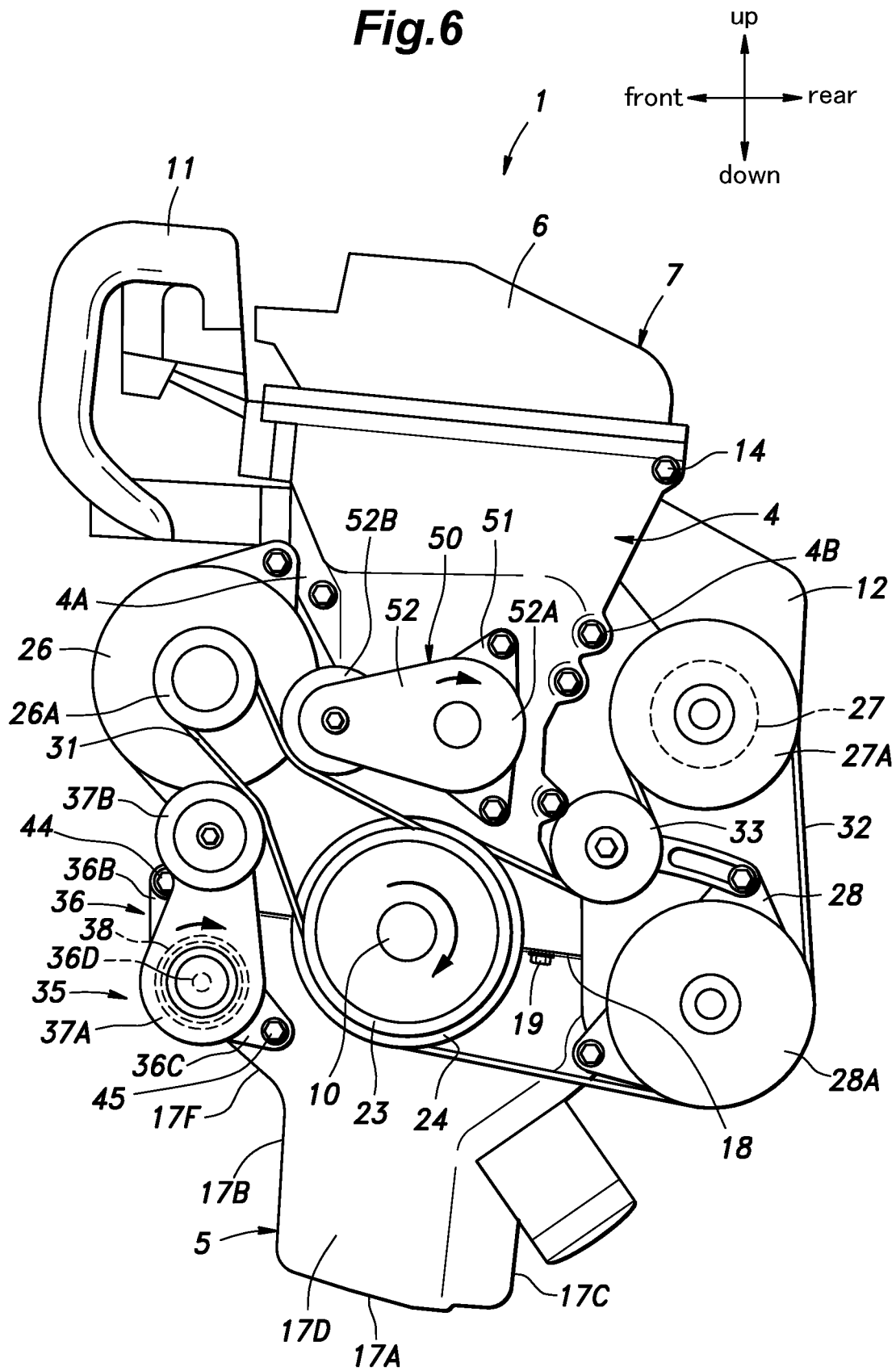
FIG. 6 is a left side view of an engine according to a partially modified embodiment.

As shown in FIG. 6, the engine 1 may include, in addition to the tensioner 35, a second tensioner 50 for applying a tension to the first belt 31. The second tensioner 50 may have a structure similar to that of the tensioner 35. A base member 51 of the second tensioner 50 is mounted on the chain case 4 at a position above the first crank pulley 23 and behind the generator pulley 26A. An arm member 52 of the second tensioner 50 is rotatably supported by the base member 51 at a base end portion 52A thereof, and extends forward from the base end portion 52A to a tip end thereof. The arm member 52 is provided with a roller 52B rotatably supported at the tip end (free end), such that the roller 52B contacts the back surface of the first belt 31. An urging member of the second tensioner 50 urges the arm member 52 counterclockwise relative to the base member 51 as viewed from the left. The second tensioner 50 is arranged such that the roller 52B contacts the tight side of the first belt 31 during regeneration of the power generator 26.

By providing the second tensioner 50 as described above, in a case where a motor-generator that can serve as a starter motor is used as the power generator 26, a tension can be applied both on the slack side and the tight side of the belt both during regeneration and motoring. In other words, even when the power generator 26 is operated in the motoring mode, a tension can be properly applied on the slack side of the first belt 31 to remove the slack.

The invention claimed is:

1. An internal combustion engine, comprising:
   a cylinder block;
   a crankshaft rotatably supported in the cylinder block;
   an oil pan fastened to a lower end portion of the cylinder block;
   a chain case fastened to one end wall of the cylinder block in an axial direction of the crankshaft;
   a belt wound around a crank pulley provided on an end portion of the crankshaft protruding from the chain case and an accessory pulley provided on an engine accessory; and
   a tensioner contacting a back surface of the belt and applying a tension to the belt,
   wherein the tensioner includes multiple fastening portions, such that one of the multiple fastening portions is fastened to at least one of the cylinder block and the chain case, and another one of the multiple fastening portions is fastened to the oil pan, and
   wherein the oil pan protrudes more outward than the end wall of the cylinder block in the axial direction of the crankshaft, and
   the chain case has a lower end fastened to an upper end of an end portion of the oil pan in a vertical direction.

2. The internal combustion engine according to claim 1, wherein the oil pan is fastened to the chain case by a bolt extending vertically, and
   the multiple fastening portions of the tensioner are fastened to the chain case and the oil pan by bolts extending in the axial direction of the crankshaft.

3. The internal combustion engine according to claim 1, wherein the tensioner includes a base member provided with the multiple fastening portions, an arm member having a base end rotatably supported by the base member and a tip end provided with a roller, and an urging member urging the arm member relative to the base member in a direction in which the tip end of the arm member approaches the belt, and
   the arm member extends upward from the base end to the tip end in a state where the roller is in contact with the belt.

4. The internal combustion engine according to claim 3, wherein the base end of the arm member is located lower than a rotation center of the crank pulley, and the tip end of the arm member is located higher than the rotation center of the crank pulley.

5. The internal combustion engine according to claim 1, wherein the oil pan includes a flange fastened to the lower end portion of the cylinder block, a ridge extending downward from the flange, and a fastening seat provided on the ridge and fastened to the other one of the fastening portions of the tensioner.

* * * * *